(12) United States Patent
Lestician (10) Patent No.: US 7,348,735 B2
(45) Date of Patent: Mar. 25, 2008

(54) LAMP DRIVER

(75) Inventor: Guy J. Lestician, East Stroudsburg, PA (US)

(73) Assignee: Inventive Holdings LLC, Manalapan, NJ (US)

( * ) Notice: Subject to any disclaimer, the term of this patent is extended or adjusted under 35 U.S.C. 154(b) by 408 days.

(21) Appl. No.: 10/835,839

(22) Filed: Apr. 30, 2004

(65) Prior Publication Data
US 2005/0001560 A1    Jan. 6, 2005

Related U.S. Application Data

(60) Provisional application No. 60/476,535, filed on Jun. 6, 2003, provisional application No. 60/466,995, filed on May 1, 2003.

(51) Int. Cl.
*H05B 41/16* (2006.01)
(52) U.S. Cl. .................. 315/247; 315/209 R; 315/291; 315/274; 315/276
(58) Field of Classification Search ................ 315/247, 315/246, 209 R, 291, 307, 274, 282, 276–279, 315/283, 287
See application file for complete search history.

(56) References Cited

U.S. PATENT DOCUMENTS

| | | | |
|---|---|---|---|
| 4,392,087 A | 7/1983 | Zansky | |
| 4,717,863 A | 1/1988 | Zeiler | |
| 4,876,485 A | 10/1989 | Fox | |
| 4,937,470 A | 6/1990 | Zeiler | |
| 5,039,920 A | 8/1991 | Zonis | |
| 5,105,127 A | 4/1992 | Lavaud et al. | |
| 5,287,040 A | 2/1994 | Lestician | |
| 5,323,090 A | 6/1994 | Lestician | |

(Continued)

OTHER PUBLICATIONS

Fairchild Semiconductor, KA7541 Simple Ballast Controller (2001).

(Continued)

*Primary Examiner*—Tuyet Vo
(74) *Attorney, Agent, or Firm*—Pepper Hamilton LLP (57) ABSTRACT

An electronic device for starting and/or re-starting a power-driven device such as a lamp, bulb or lighting fixture includes an input stage, a rectifier stage, a power factor correction stage with total harmonic distortion correction, and a coil device comprising a wound coil having a primary winding of multistranded wire. The circuit may automatically adjust to a range of loads, and/or it may provide an auto-ranging line voltage. In an embodiment, the input stage accepts an AC input signal, the rectifier stage converts the AC input signal to a DC signal, and the coil device converts the DC signal to an AC output signal. The device may also include a frequency adjustment circuit that adjusts the frequency of the AC output signal to assistance in the performance of a restart function.

13 Claims, 11 Drawing Sheets

U.S. PATENT DOCUMENTS

| | | | |
|---|---|---|---|
| 5,343,122 A | * | 8/1994 | Sugimori et al. ........ 315/209 R |
| 5,519,289 A | * | 5/1996 | Katyl et al. .................. 315/224 |
| 5,521,467 A | | 5/1996 | Statnic et al. |
| 5,900,701 A | | 5/1999 | Guhilot et al. |
| 5,925,986 A | | 7/1999 | Moisin |
| 5,929,563 A | | 7/1999 | Genz |
| 6,344,717 B1 | | 2/2002 | Lestician |
| 6,507,157 B1 | | 1/2003 | Erhardt et al. |
| 6,555,972 B1 | | 4/2003 | Lestician |
| 6,952,355 B2 | * | 10/2005 | Riggio et al. ............. 363/21.15 |
| 7,095,185 B2 | * | 8/2006 | Nemirow et al. ........... 315/291 |
| 2002/0030455 A1 | * | 3/2002 | Ghanem ..................... 315/291 |
| 2003/0038602 A1 | | 2/2003 | Lestician |

OTHER PUBLICATIONS

Fairchild Semiconductor, KA7540 Simple Dimming Ballast Control IC (2001).

Micro Linear Corporation, ML4833 Electronic Dimming Ballast Controller (Apr. 1997).

* cited by examiner

PRIOR ART

LAMP DRIVER

RELATED APPLICATIONS

This application claims priority to, and incorporates by reference, U.S. provisional patent application No. 60/466,995, filed May 1, 2003, and U.S. provisional patent application No. 60/476,535, filed Jun. 6, 2003.

TECHNICAL FIELD

This application relates to electronic lighting systems. More specifically, the present invention relates to an electronic controller for striking, restriking and/or dimming a power-driven device such as a lamp, bulb or other lighting fixture.

BACKGROUND

Electronic controllers such as ballasts are commonly used for starting and restarting large lighting fixtures, such as those found in street lights, warehouse stores and the like. To start and/or restart such a lighting fixture, a ballast that delivers a very high current, and thus a very high power, has been required. This requirement significantly increases operating costs, especially when additional power is required to turn on a light. It also reduces the life of the bulb since a high current spike can stress and degrade the filament and/or gas contained within the bulb. Further, the conventional ballast is heavy and must be located near the bulb unless a very substantial wiring system is installed throughout the building or other location in which the bulbs are installed.

Thus, it is desirable to develop an improved electronic lamp driver system that delivers a low start up current that is still capable of striking and restriking hot a bulb in a large lighting fixture such as lighting fixtures having bulbs in the range of 100 watts to 2000 watts.

BRIEF SUMMARY

A preferred embodiment of the invention provides an electronic device for starting and/or re-starting a power-driven device such as a lamp, bulb or lighting fixture. In an embodiment, the device includes an input stage, a rectifier stage, a power factor correction stage, and a coil device comprising a wound coil having a primary winding of multistranded wire. The circuit may automatically adjust to a range of wattages and/or loads. In an embodiment, the input stage accepts an AC input signal, the rectifier stage converts the AC input signal to a DC voltage level, and the coil device converts the DC signal to an AC output signal.

The power factor correction stage may include a single-stage or a two-stage power factor correction controller. The device may also include a feedback stage, a filter stage, an output stage including a ballast controller and one or more MOSFETs, and/or a frequency adjustment circuit that adjusts the frequency of the AC output signal. In an embodiment, at least one of the stages includes a thermal cutout component. The power factor correction stage may also include a coil device having a primary winding of multistranded wire.

The output coil device may be a choke or transformer when the device is used to control the delivery of power to one or more non-fluorescent bulbs. Alternatively, the coil device may include a secondary winding and serve as a transformer for the delivery of power to one or more fluorescent lamps.

In an embodiment, the circuit may include an input stage, a rectifier stage, and a power factor correction stage, and it may provide an auto-ranging line voltage for the operation of a variety of loads.

DETAILED DESCRIPTION

Figure 1:
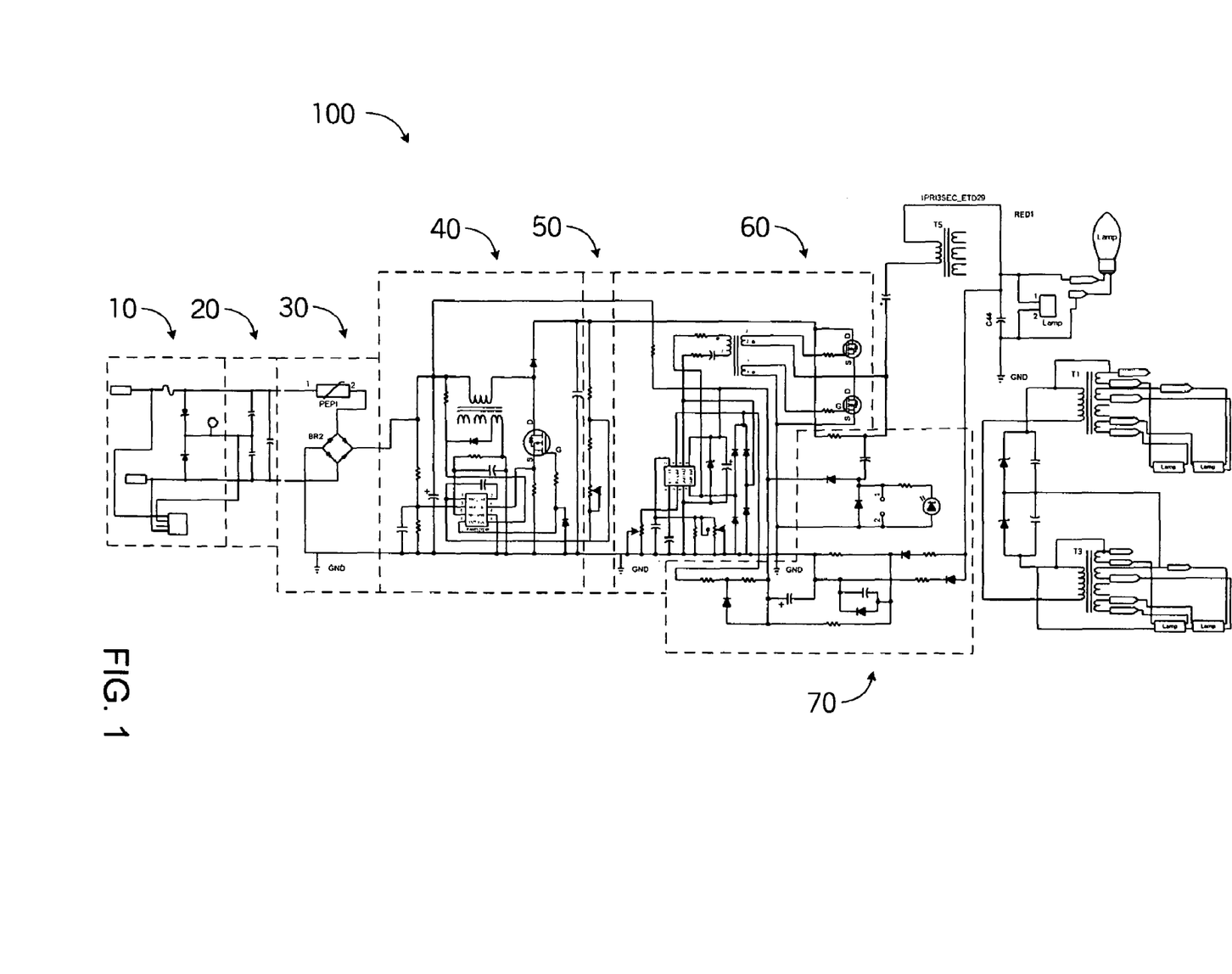
FIG. 1 illustrates an embodiment of the present inventive lamp driver, in this illustration showing the driver being used to drive a non-fluorescent lamp, with an optional alternate output for two sets of fluorescent lamps, also shown.

An embodiment of the present inventive lamp driver system is illustrated in FIG. 1. As indicated in FIG. 1, the exemplary system 100 may include as many as seven stages or more, each of which may provide additional features for the system.

Referring to FIG. 1, in the illustrated embodiment the first stage of the device 10 receives an input voltage and operates as an AC power supply. The input stage 10 may accept an input voltage that is at least between the range of 80 and 300 volts, with signal frequencies at approximately 50 to 60 kHz, although other voltages and frequencies are possible depending on the application. The second stage 20 functions as electromagnetic interference (EMI) filter. The third stage 30 functions as a DC rectifier, converting the AC input voltage to a DC voltage, with a connection to a feedback circuit. The fourth stage 40 operates as a power factor correction stage. The fifth stage 50 operates as a high-voltage power filter. The sixth stage 60 operates as the output stage to deliver power to one or more lamps or other devices. The seventh stage 70 is a general feedback stage. Although FIG. 1 as illustrated defines a boundary for the feedback stage 70, the boundary is only intended to illustrate a portion of the feedback stage 70. In fact, feedback is typically provided to each of stages 30, 40, 50 and 60.

Figure 2:
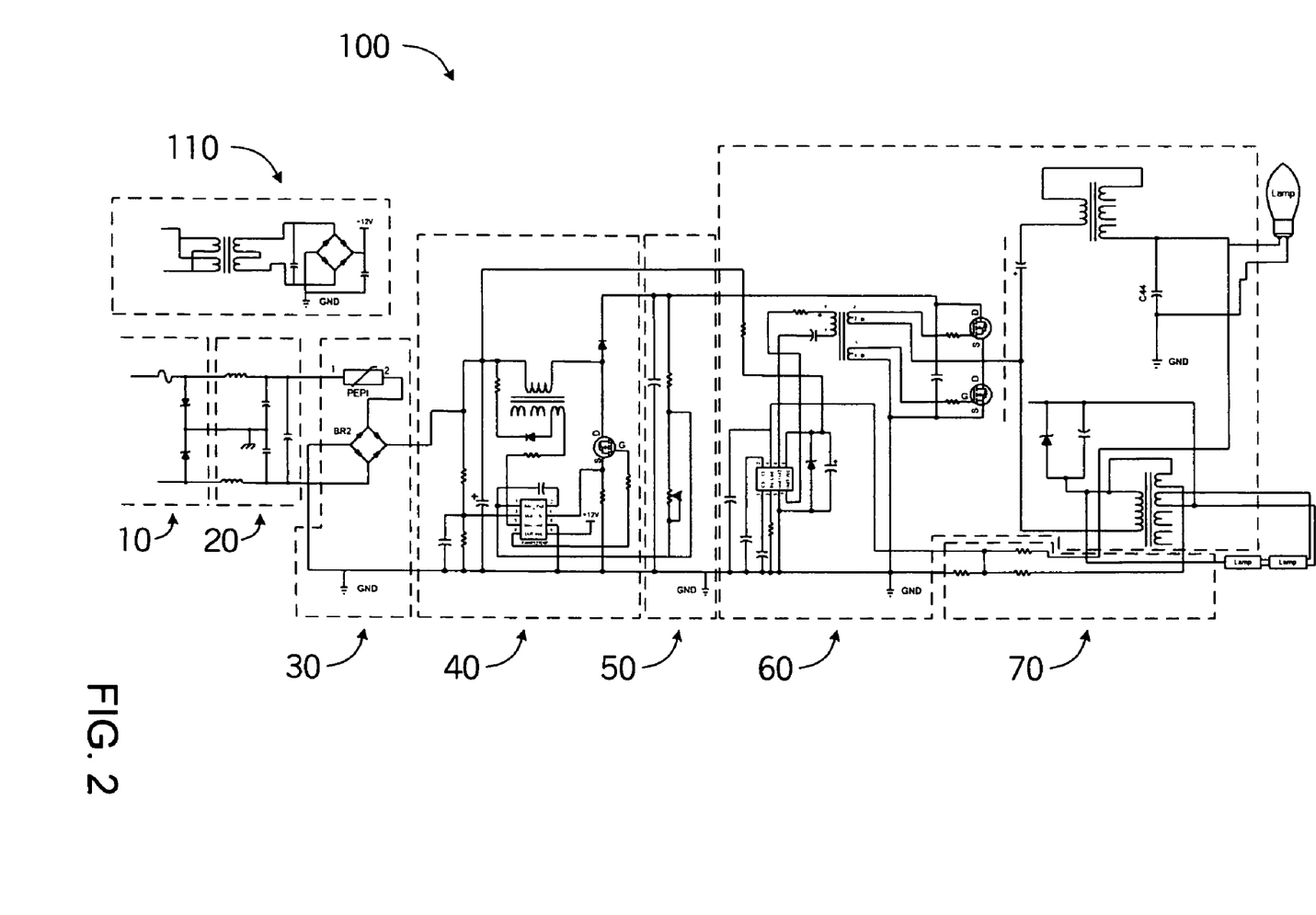
FIG. 2 illustrates an alternate embodiment of the lamp driver, in this case driving one non-fluorescent lamp and two fluorescent lamps.

As illustrated in FIG. 2, in an alternate embodiment an external power source 110 that is not generally considered to be a stage of the device 100 may be provided. In the embodiment of FIG. 2, power source 110 provides a low-voltage power source for the electronic devices in device 100. FIG. 2 illustrates stages in a manner using a numbering system showing their correspondence to FIG. 1.

FIG. 3 through FIG. 10 provide additional detail of embodiments of the individual stages described above and illustrated in FIG. 1. The values listed below for individual elements are exemplary values only and should not be interpreted as limiting. Persons skilled in the art will recognize that other values are possible without departing from the spirit and scope of the invention.

Figure 3:
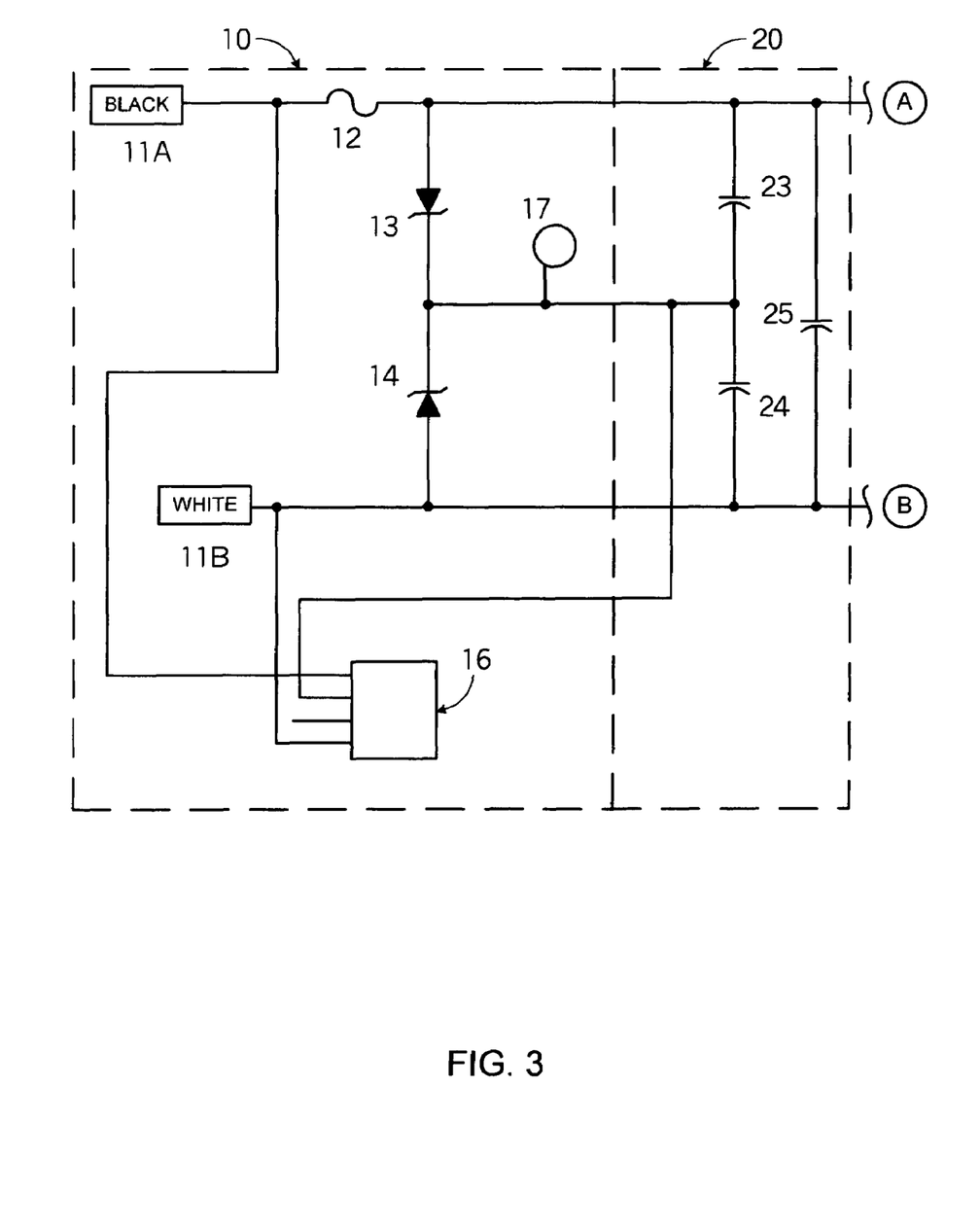
FIG. 3 illustrates input and filter stages of the embodiment of FIG. 1.

Exemplary elements of input stage 10 and second stage 20 are illustrated in FIG. 3. Referring to FIG. 3, input stage 10 includes a power source, optionally between 80 and 300 volts and at signal frequencies between about 50 and about 60 kHz, or plug 16 at AC inputs 11A and 11B, a line fuse 12, and two varistors 13 and 14. In the illustrated embodiment, the power source may be a 120V, 50/60 kHz voltage source, and the line fuse 12 may be a 1.5 A fuse for a driver for a 150 watt lamp. When the circuit is used to light higher intensity lamps, larger fuses may be needed, such as a 5 amp fuse for a 400 watt bulb. Varistors or zener diodes 13 and 14 may function as surge protection devices connected between each of the AC inputs and ground 17. When a power surge or voltage spike is exhibited on the AC inputs, the resistance of varistors or zener diodes 13 and 14 may quickly decrease, creating a shunt path for the over-voltage. In this way, other components in the device may be protected from power surges.

The EMI filter stage 20 of the device may function as a noise filter. In the filter stage, an LC filter may be replicated between each AC input 11A and 11B and ground. The LC filters operate as noise filters to remove unwanted frequencies from the AC voltage input source. The LC filters may be composed of optional inductors 21 and 22 (not shown in FIG. 3, but shown in the embodiment of FIG. 2), and capacitors 23 and 24. In an embodiment, the inductors 21 and 22 may have an inductance of approximately 600 nH, and capacitors 23 and 24 may have a capacitance of approximately 2.2 nF. Capacitor 25 may have a capacitance of 0.15 µF. Other values are possible without departing from the spirit and scope of the invention.

Figure 4:
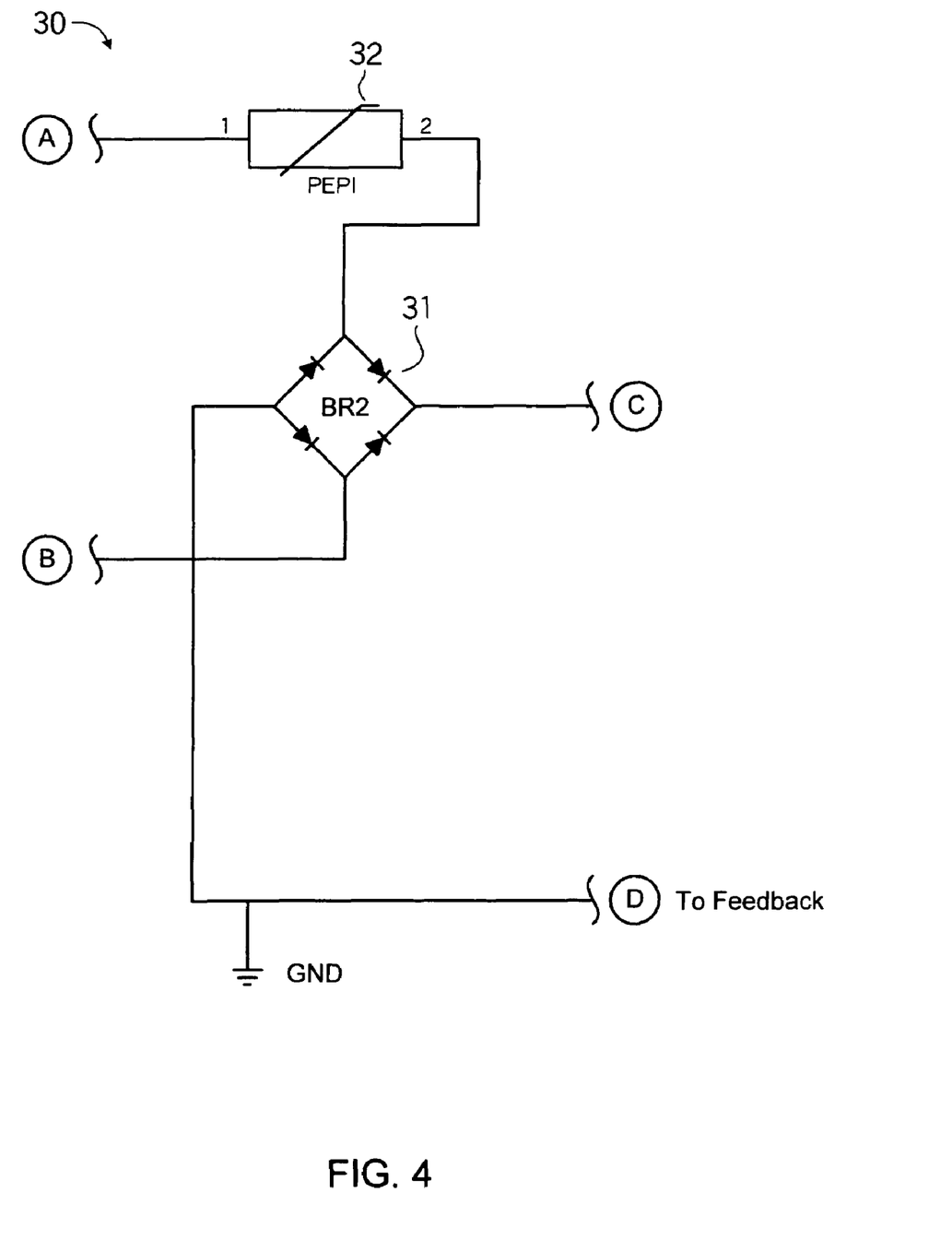
FIG. 4 illustrates elements of the DC rectifier stage of FIG. 1.

The DC rectifier stage 30 may convert the AC input signal into a DC voltage. Exemplary elements of the DC rectifier stage 30 are illustrated in FIG. 4. Diode bridge 31 functions as a full wave bridge and converts the AC input voltage into a DC output voltage. Diode bridge 31 may be made of a full wave rectifier, or it may be four separate diodes, such as 4-amp diodes. The use of separate diodes instead of a rectifier is preferred for higher wattage drivers. Diode bridge 31 may be connected to the feedback stage 70 via the ground plane. The connection between diode bridge 31 and ground may stabilize the voltage differential across the bridge. Optional thermal cutout component 32 may operate as a temperature-sensitive, protective device to shut down the operation of diode bridge 31 in certain thermal conditions. For example, thermal component 32 may trigger a shut down when it senses an external temperature of 105° C., which may indicate a fire.

Figure 5:
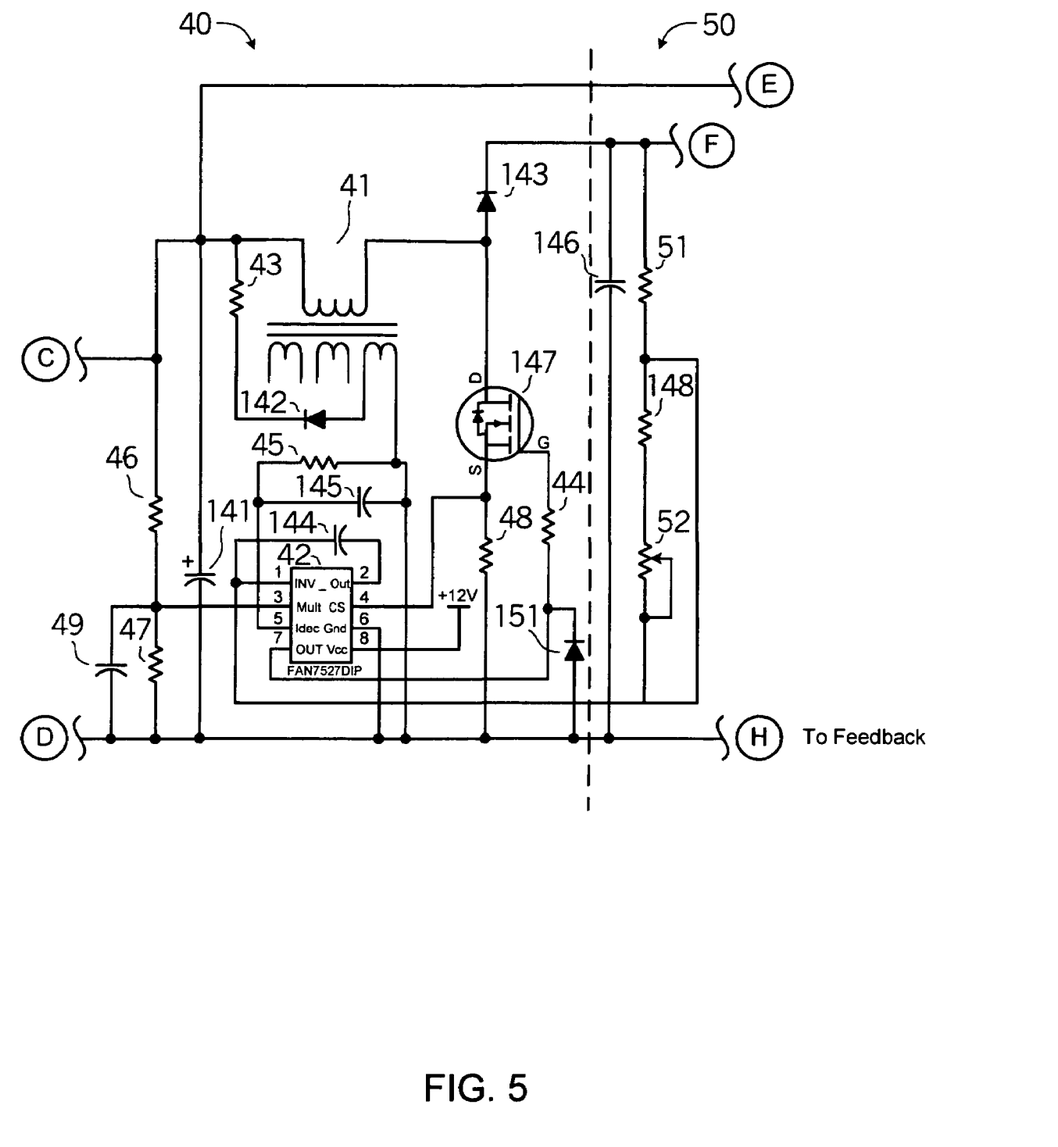
FIG. 5 illustrates exemplary elements of the power factor correction stage of FIG. 1 and the high voltage power filter stage of FIG. 1.

Exemplary elements of the power factor correction stage 40 are illustrated in FIG. 5. A coil device 41 operates to boost the output voltage based on the lamp or lamps (or other device or devices) attached to the output of device 100. A coil device 41 using multistranded wire is described in co-pending U.S. patent application Ser. No. 10/834,778, entitled "Coil Device", filed Apr. 29, 2004, which is incorporated herein by reference in its entirety. Other coil devices are possible without departing from the spirit and scope of the invention. The coil device preferably includes a secondary winding when it is used as a power circuit for the ballast. The power factor correction circuit may be used to make a nonlinear load operate like a resistive load by putting it into phase. This correction may also help to reduce total harmonic distortion. In one embodiment, the power factor correction controller 42 may be a Fairchild Semiconductor FAN7527 or similar device. The power factor correction controller 42 may be used along with one or more resistors 44-48; one or more capacitors 49, 141 and 144; one or more diodes 142 and 143; a coil device 41; and MOSFET 147 to create a power factor correction circuit.

In one embodiment corresponding to FIG. 2, resistors 43, 44, 45, 46, 47 and 48 may have resistances of approximately 150 kΩ, 47Ω, 22 kΩ, 2.1 MΩ, 14.7 kΩ and 1Ω, respectively, and capacitors 49, 141 and 144 may have capacitances of approximately 0.01 µF, 100 MF and 0.22 µF, respectively with capacitor 145 and its corresponding wiring not being present. In an alternate embodiment corresponding to FIG. 1, resistors 43, 44, 45, 46, 47 and 48 may have values of approximately 180Ω, 10Ω, 22 kΩ, 2.2 MΩ, 27 kΩ, and 0.25Ω, respectively, while capacitors 49, 141, 144 and 145 may have values of approximately 1 nf, 0.47 µF, 1 µF and 1 MF, respectively. The embodiment shown in FIGS. 1 and 5 may also include a diode 151.

Figure 11:
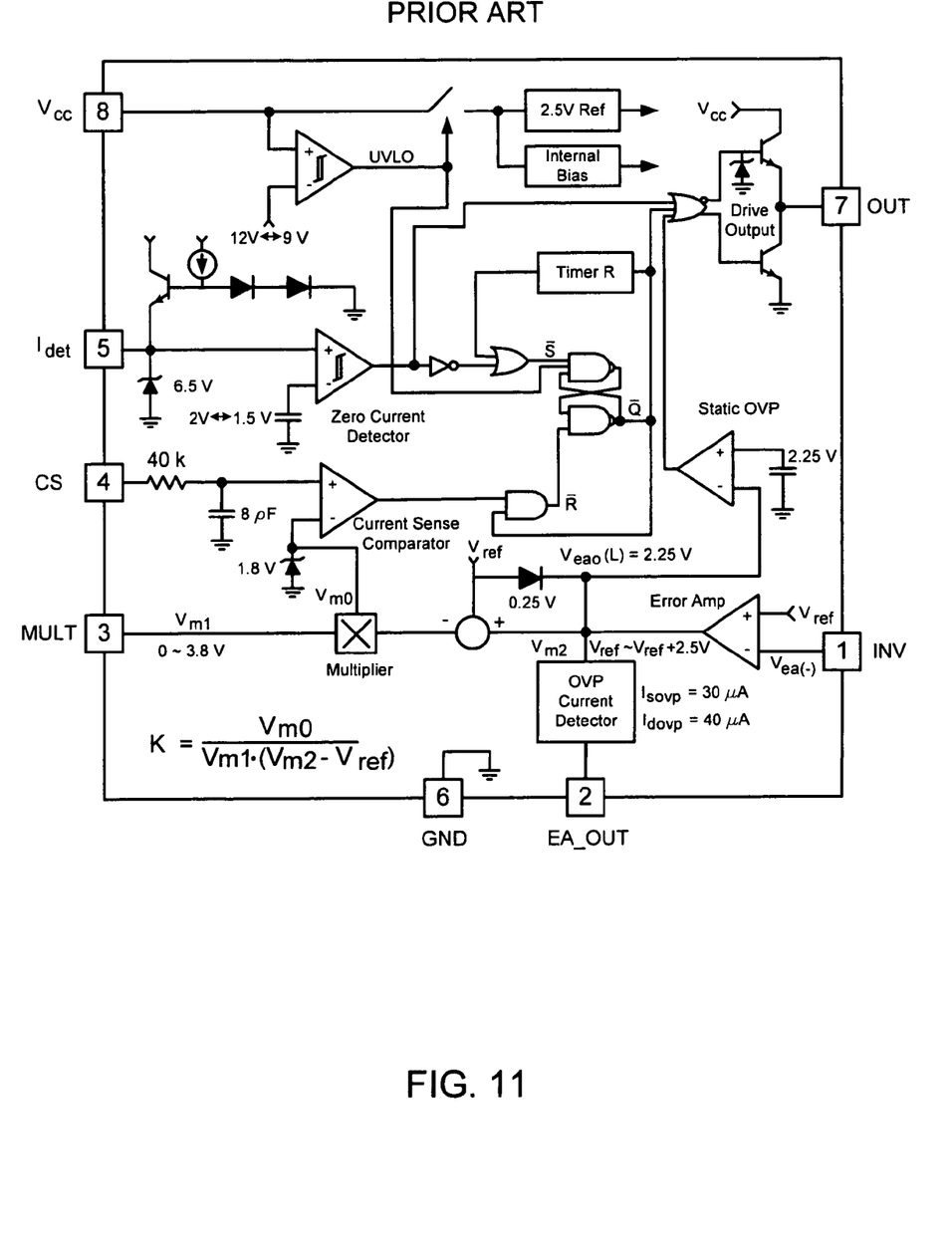
FIG. 11 is a block diagram of a prior art power factor correction circuit.

In the embodiment illustrated in FIG. 5, the power factor correction device 42 includes a two-stage power factor correction microchip. An example of such a microchip is the FAN7527B supplied by Fairchild Semiconductor. Unlike the prior art, which used three-stage or other microchips, the two-stage microchip provides several advantages in that it uses substantially the same frequency for pre-startup heating and actual startup, thus providing a power saving advantage. The pre-startup heating and actual startup frequency may each be, for example, approximately three times normal operating frequency. The operation of a prior power factor correction circuit is described in Fairchild Application Note AN4107, published May 2000, and is illustrated in FIG. 11.

Exemplary elements of a high voltage power filter stage 50 are also illustrated in FIG. 5. For a 150 watt unit, stage 50 may incorporate resistor 51 and variable resistor 52. In an embodiment, resistor 51 may have a resistance of about 1.1 MΩ, and variable resistor 52 may have a peak resistance of about 10 kΩ. The optional variable resistor 52 may be used to adjust the frequency of the output signal by changing its voltage, since a higher voltage will result in a higher frequency. A higher frequency may also change the wavelength of the output signal. Optional resistor 148, such as a 6 kΩ resistor, may also be used. In an embodiment, the frequency of the output signal may be varied so that the lamp or lamps connected to the output of the ballast device may create light emissions of varying wavelengths, selected based on the attributes of the bulb or load to be driven. For example, a high pressure sodium bulb may handle a lower frequency, such as 20-40 kHz, while a xenon bulb may require a higher frequency, such as 150 kHz or more. In an alternate embodiment, the variable resistor may be set to a constant value to achieve a known frequency and create light emissions of a known wavelength. Capacitor 53 illustrated in FIG. 5 may have a resistance of between 47 MF and 100 MF. Other values are possible.

Figure 6:
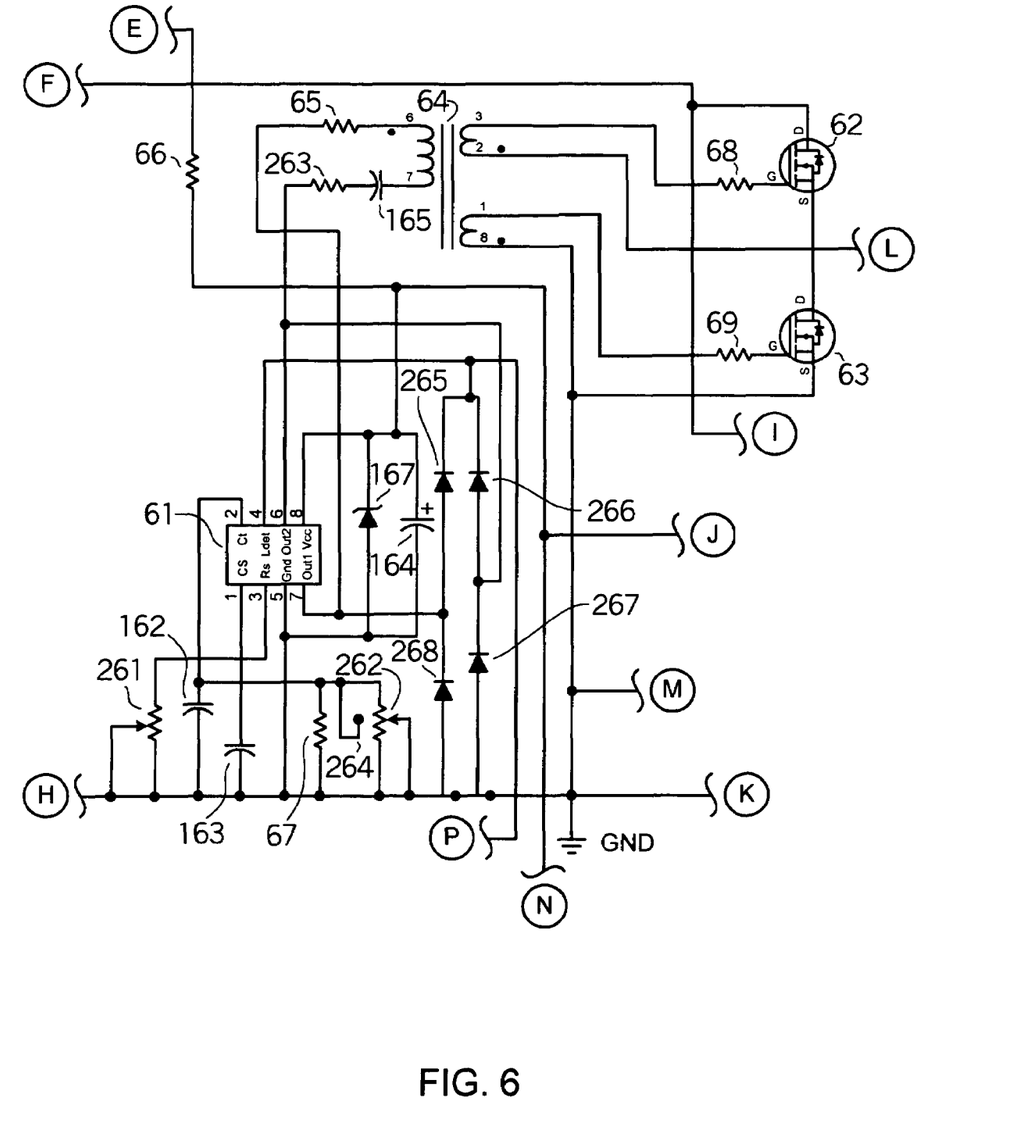
FIG. 6 illustrates exemplary elements of the output stage of FIG. 1.
Figure 7:
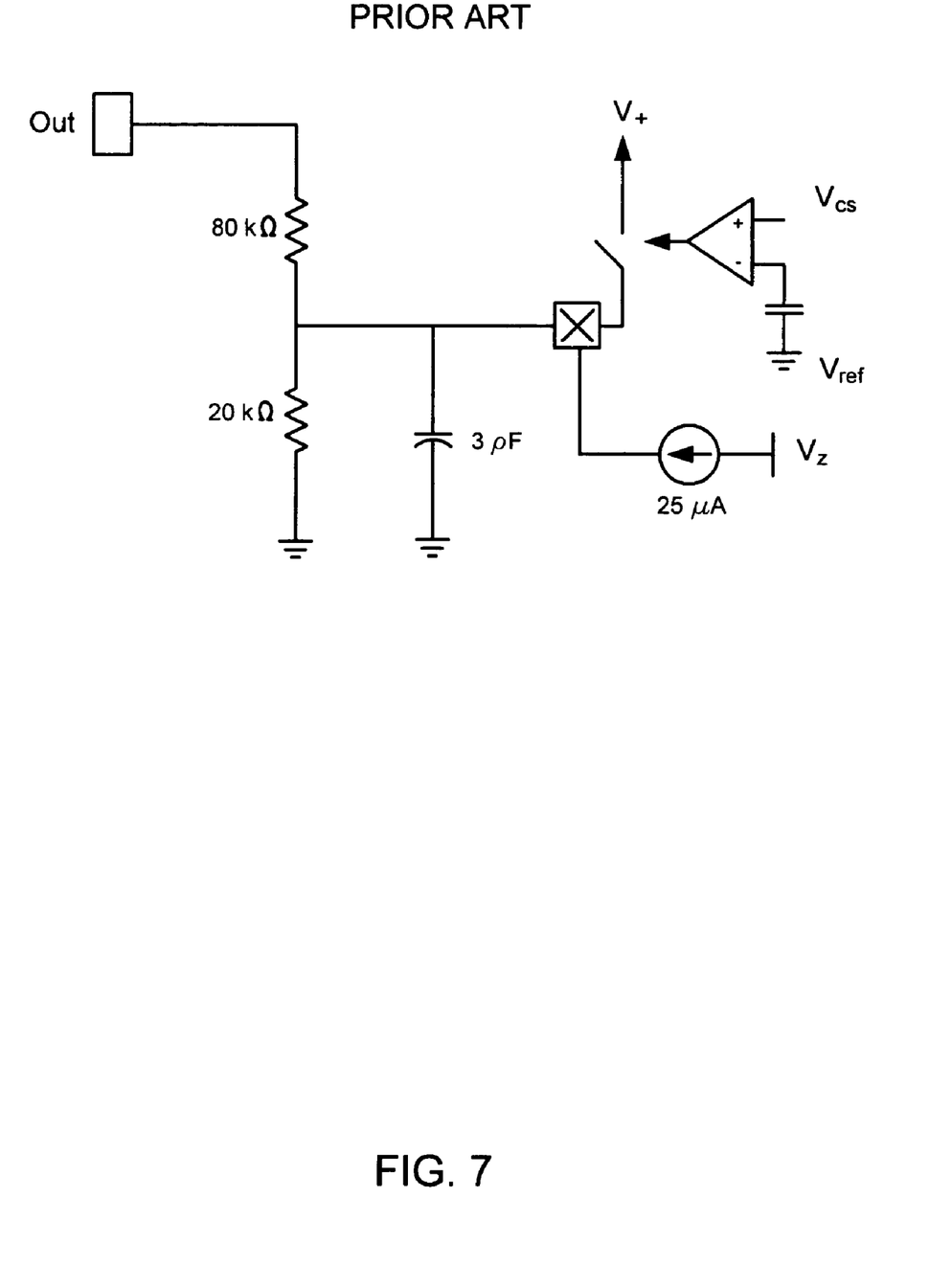
FIG. 7 illustrates a prior art dimming circuit.

Preferred elements of an output stage 60 are illustrated in FIG. 6. Referring to FIG. 6, a controller 61 may be implemented by a ballast controller such as a Fairchild Semiconductor KA7540 or KA7541 or a similar device. The controller 61 is used to produce the high output voltage required to drive the output MOSFETs 62 and 63 in conjunction with a standard gate driver 64. The MOSFETs 62 and 63 blend the injected frequency component output from stage 50 and the high voltage driven from the standard gate driver 64 to produce the proper signal to the lamps and/or bulbs. The drain port of MOSFET 62 is driven by stage 50 at a high voltage (such as 400 volts) and receives a pulse input at a frequency determined by the variable resistor 52. The resulting output of MOSFETs 62 and 63 may be a switching DC square wave or substantially square wave.

Preferred, although not required, values for various elements in FIG. 6 are that resistors 263, 65, 66, 67, 68 and 69 may be approximately 51Ω, 51Ω, 150 KΩ, 22 KΩ, 51Ω and 51Ω, respectively. Variable resistors 261 and 262 may each have values of up to 1 KΩ. Capacitors 162, 163, 164, and 165 may be approximately 100 pF, 0.22 µF, 47 MF, and 0.27 µF, respectively. Varistor 167 may be a 15 volt Zener diode. Diodes 265, 266, 267 and 268 may be, for example, 300 volt diodes. In each case, other values are possible.

The use of a Fairchild Semiconductor KA7540 as controller 60 may allow for enhanced restriking capability when the circuit is used for non-fluorescent bulbs. However, in an alternate embodiment, a different controller 61 such as a Fairchild Semiconductor KA7541 may be used. In such a case, one skilled in the art will recognize that the dimming circuit inside the KA7540 is not present in the KA7541, and that such dimming capability may need to be replicated or otherwise added to the lamp driver in order to restrike a non-fluorescent bulb. An illustration of the prior art dimming circuit of the KA7450, as presented in the Fairchild Semiconductor product specification, is presented in FIG. 7. Another option may be to include a capacitor which will allow a high starting current with gradual dimming.

Figure 8:
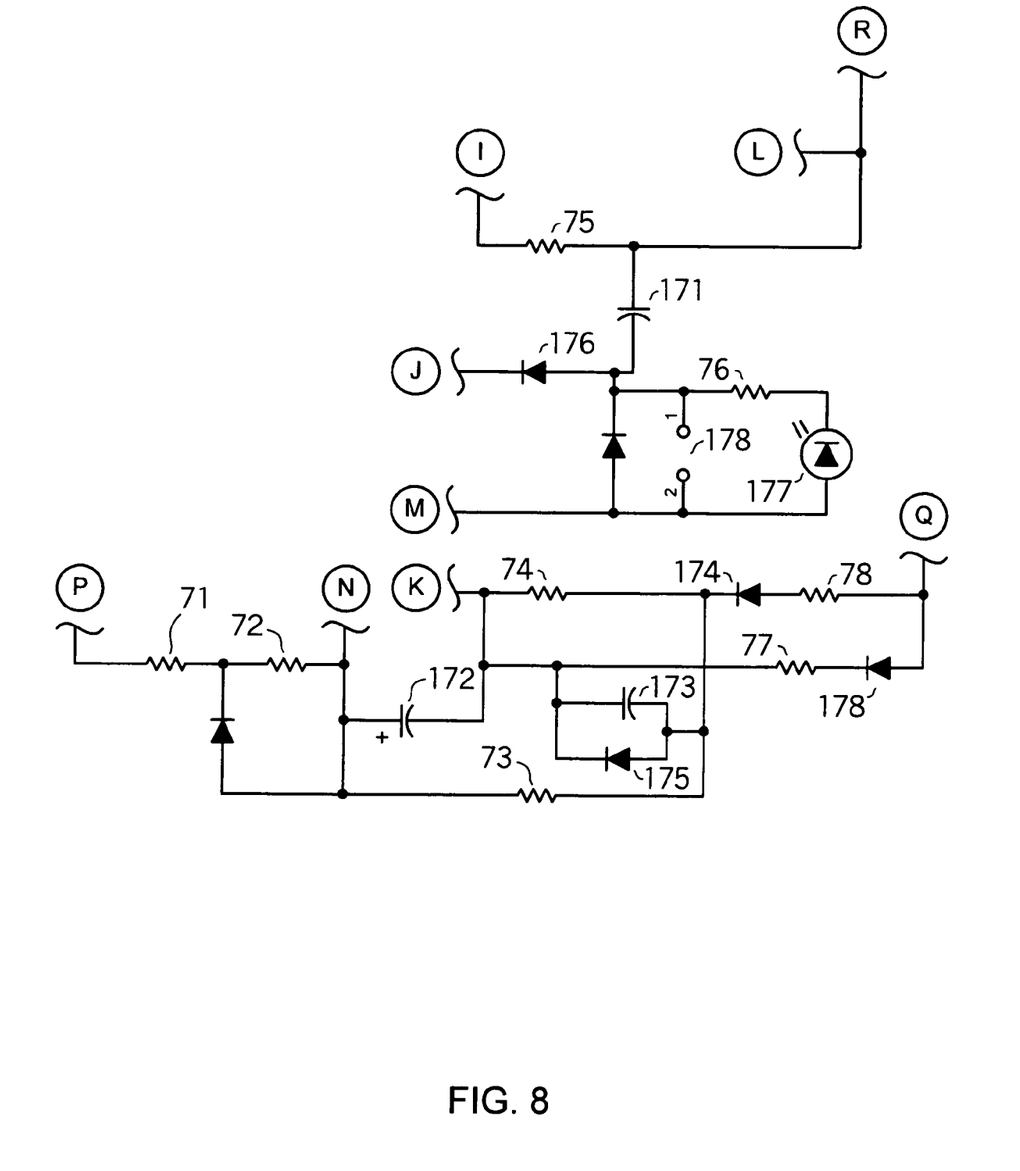
FIG. 8 illustrates an embodiment of the feedback stage of FIG. 1

Referring to FIG. 8, feedback stage 70 is a general feedback stage in which the output voltage level is transmitted to other stages to permit for corrections in the total voltage differential in the circuit. Referring to FIG. 8, exemplary values for resistors 71, 72, 73, 74, 75, 76, 77 and 78 are maybe 10 KΩ, 100 KΩ, 442 KΩ, 220 KΩ, 180 KΩ, 10 KΩ, 200 KΩ and 442 KΩ, respectively, while exemplary values of capacitors 171, 172, and 173 may be 1 nF, 1 mF and 1 nF, respectively. Other values are possible. Optional indicator light 177 may provide an indication of when the bulb is restriking. The feedback stage 70 may also serve as a circuit to turn off MOSFETs 62 and 63 when a bulb is not installed in the system. Although FIG. 8 illustrates a boundary for the feedback stage 70, the boundary is only intended to illustrate a portion of the feedback stage 70. In fact, feedback is typically provided to each of stages 30, 40, 50 and 60.

Figure 9:
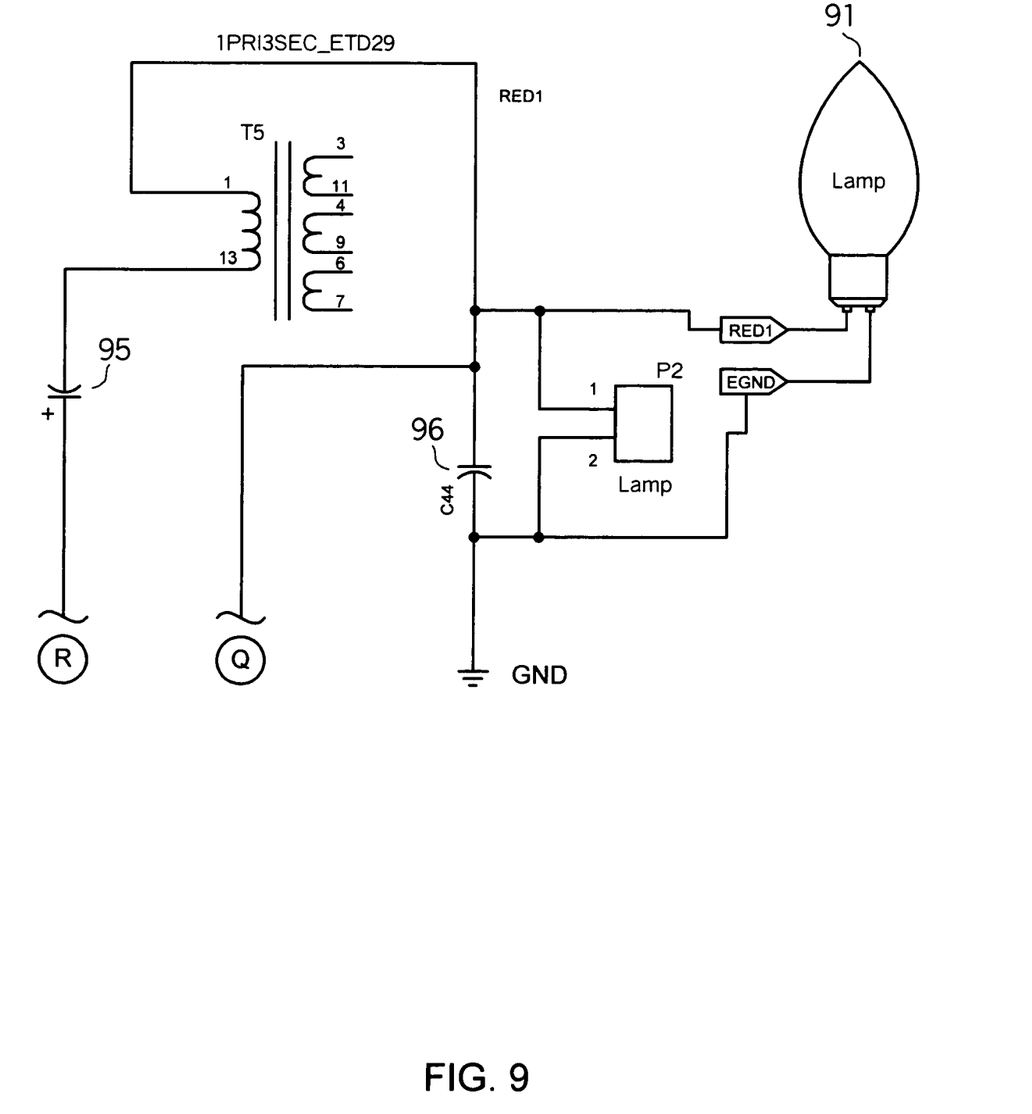
FIG. 9 illustrates an embodiment where the lamp driver drives a non-fluorescent lamp.

The output waveform of the device may drive one or more lamps, one or more bulbs, or any combination of the two or other devices. Referring to FIG. 9, if one or more non-fluorescent bulbs 91 are driven, a coil device 82 similar to the one illustrated in stage 40 may be used to convert the DC square wave output from stage 60 of the ballast device into an AC sine wave. An exemplary coil device 82 is the multistranded wire device with a secondary winding as illustrated in pending U.S. patent application Ser. No. 10/834,778, filed Apr. 29, 2004, entitled "Coil Device", which is incorporated herein by reference in its entirety. Such a device may include a primary winding of multi-stranded wire, such as that commonly known as litz wire. The coil device includes a conductive core positioned inside the primary winding and outside the primary winding. The core that is positioned inside the primary winding may include an air gap. The primary winding is preferably covered by an insulating layer. In this case, a secondary winding may not be required and the device may be used as a choke.

Referring again to FIG. 9, exemplary values for capacitors 95 and 96 are 0.68 µF (for a 400 volt line) and 0.012 µF, respectively.

Figure 10:
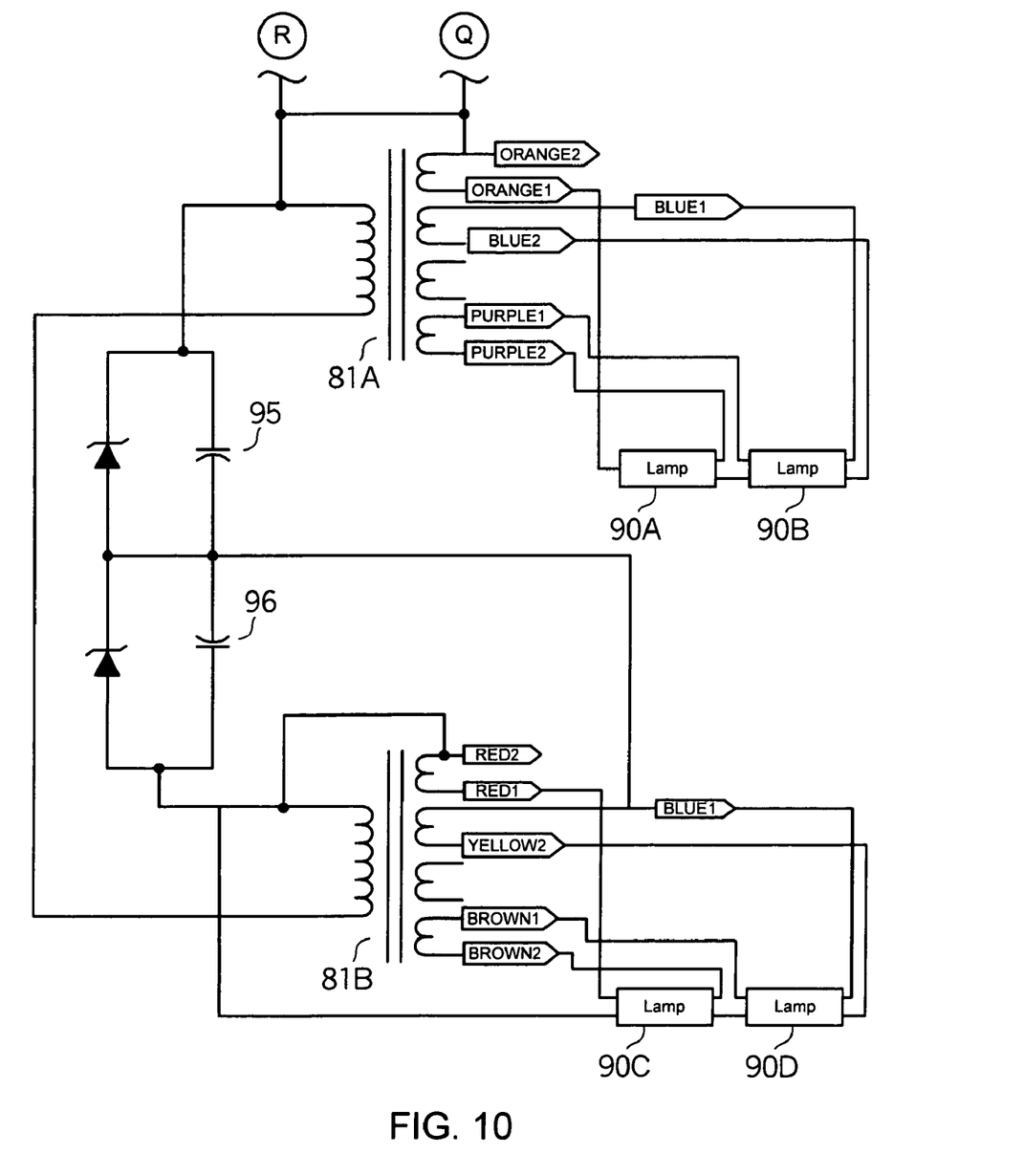
FIG. 10 illustrates an embodiment where the lamp driver drives multiple fluorescent lamps.

Referring to FIG. 10, if one or more fluorescent lamps 90A-90D are driven, the coil device 81 illustrated in co-pending U.S. patent application Ser. No. 10/834,778, entitled "Coil Device", filed Apr. 29, 2004, may also be used. An optional secondary winding may also be provided around the primary winding to allow the device to operate as a transformer. Optionally, the secondary winding may also be made of multistranded wire.

If two or more fluorescent lamps are connected, they may be connected in series as illustrated in FIG. 10. Each combination of two fluorescent lamps preferably has a single associated coil device. If two or more non-fluorescent bulbs are used (such as metal halide bulbs), each non-fluorescent bulb preferably has its own coil device as illustrated in FIG. 9. Additional configurations with additional lamps are possible.

The present inventive ballasts may be used to light a variety of bulbs, and in an embodiment the ballasts automatically adjust to the value of the load. Thus, one ballast can be used to operate lamps of varying wattages, such as those ranging from 150 watts to 400 watts in an embodiment. Optionally, it may also be lighter in weight than many conventional ballasts.

In examples, in one embodiment the lamp driver was used in connection with a ballast controller to light a metal halide lamp, and it was found that the device automatically adjusted to a 1-amp current flow for a 150-watt lamp and a 3.4-amp current flow for a 400-watt lamp. Certain embodiments of the lamp driver may be separated from the lamp by a wire distance of as much as 200 feet or more without any significant loss of output.

It is to be understood that the invention is not limited in its application to the details of construction and to the arrangements of the components set forth in this description or illustrated in the drawings. The invention is capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

The invention claimed is:

1. An electronic circuit, comprising:
   an input stage;
   a first filter connected to the input stage;
   a rectifier stage connected to the first filter;
   a power factor correction stage connected to the rectifier stage, wherein the power factor correction stage comprises a two-stage power factor correction controller;
   a second filter connected to the power factor correction stage; and
   an output coil device comprising a wound coil having a primary winding of multistranded wire, wherein the power factor correction stage and the output coil device are configured to deliver a reduced start-up current to a device connected to the electronic circuit.

2. The circuit of claim 1 further comprising a feedback stage.

3. The circuit of claim 1, wherein the circuit automatically adjusts to a range of loads.

4. The circuit of claim 1 wherein at least one of the stages includes a thermal cutout component.

5. The circuit of claim 1 wherein the power factor correction stage further includes a coil device having a primary winding of multistranded wire.

6. The circuit of claim 1 wherein the output coil device comprises a choke, and the circuit will control the delivery of power to one or more non-fluorescent bulbs.

7. The circuit of claim 1 wherein the output coil device further includes a secondary winding, and the circuit will control the delivery of power to one or more fluorescent bulbs.

8. The circuit of claim 1 further comprising an output stage including a ballast controller and one or more MOSFETs.

9. The circuit of claim 1 wherein the output coil device comprises a transformer or a choke.

10. The circuit of claim 1, wherein the circuit is for driving at least one of the following:

a fluorescent bulb; and a high-intensity discharge bulb.

11. The circuit of claim 1, wherein the circuit is for driving a metal halide bulb.

12. The circuit of claim 1 wherein:

the input stage is configured to accept an AC input signal;

the rectifier stage is configured to convert the AC input signal to a DC signal; and the coil device is configured to convert the DC signal to an AC output signal.

13. The circuit of claim 12 further comprising a frequency adjustment circuit that is configured to adjust the frequency of the AC output signal.

* * * * *